(12) United States Patent
Li et al.

(10) Patent No.: US 11,624,635 B1
(45) Date of Patent: Apr. 11, 2023

(54) METHOD FOR REALIZING HIGH STABILITY OF MICRO-NANO OPTICAL FIBER SAGNAC LOOP OUTPUT BY MEANS OF FILTER MODE CONTROL

(71) Applicant: SHANDONG UNIVERSITY OF SCIENCE AND TECHNOLOGY, Qingdao (CN)

(72) Inventors: Lijun Li, Qingdao (CN); Tianzong Xu, Qingdao (CN); Qian Ma, Qingdao (CN); Xiaolei Liu, Qingdao (CN); Jianhong Sun, Qingdao (CN); Zhaochuan Zhang, Qingdao (CN)

(73) Assignee: SHANDONG UNIVERSITY OF SCIENCE AND TECHNOLOGY, Qingdao (CN)

(*) Notice: Subject to any disclaimer, the term of this patent is extended or adjusted under 35 U.S.C. 154(b) by 0 days.

(21) Appl. No.: 17/910,024

(22) PCT Filed: Jun. 21, 2021

(86) PCT No.: PCT/CN2021/101135
§ 371 (c)(1),
(2) Date: Sep. 8, 2022

(87) PCT Pub. No.: WO2022/041970
PCT Pub. Date: Mar. 3, 2022

(30) Foreign Application Priority Data

Aug. 25, 2020 (CN) .......................... 202010860521.X

(51) Int. Cl.
*G01D 5/353* (2006.01)
(52) U.S. Cl.
CPC ................................ *G01D 5/35322* (2013.01)
(58) Field of Classification Search
CPC ................................................. G01D 5/35322
See application file for complete search history.

(56) References Cited

U.S. PATENT DOCUMENTS

| 4,825,261 A * | 4/1989 | Schroeder ............ G01C 19/727 |
| | | 356/461 |
| 10,630,391 B1 * | 4/2020 | LaGasse .......... H04B 10/50577 |
| 2022/0260373 A1 * | 8/2022 | Paniccia .............. G01C 19/727 |

FOREIGN PATENT DOCUMENTS

| CN | 109374027 A | 2/2019 |
| CN | 109494555 A | 3/2019 |
| WO | 2022/041970 A1 | 3/2022 |

OTHER PUBLICATIONS

International Search Report and Written Opinion issued in International Patent Application No. PCT/CN2021/101135; dated Aug. 27, 2021; 17 pgs.

(Continued)

*Primary Examiner* — Jonathan M Hansen
(74) *Attorney, Agent, or Firm* — Hauptman Ham, LLP

(57) ABSTRACT

The present invention provides a method for realizing high stability of micro-nano optical fiber sagnac loop output by means of filter mode control, and belongs to the field of photoelectric detection technologies. In the present invention, the optical filter is combined with the micro-nano optical fiber Sagnac interference structure so as to control the Sagnac in-loop working mode by use of the mode selection characteristics of the filter. In this way, the interference mode is suppressed to better concentrate energy on the working mode, thereby improving the spectrum output uniformity and stability of the Sagnac loop. Further, the reflection and transmission modes of the optical filter do not participate in interference spectrum output and thus the performance of the system will not be affected. By designing and changing the parameters of the optical filter, the output characteristics of the interferometer can be dynamically controlled.

2 Claims, 5 Drawing Sheets

(56) References Cited

OTHER PUBLICATIONS

Figure 1:
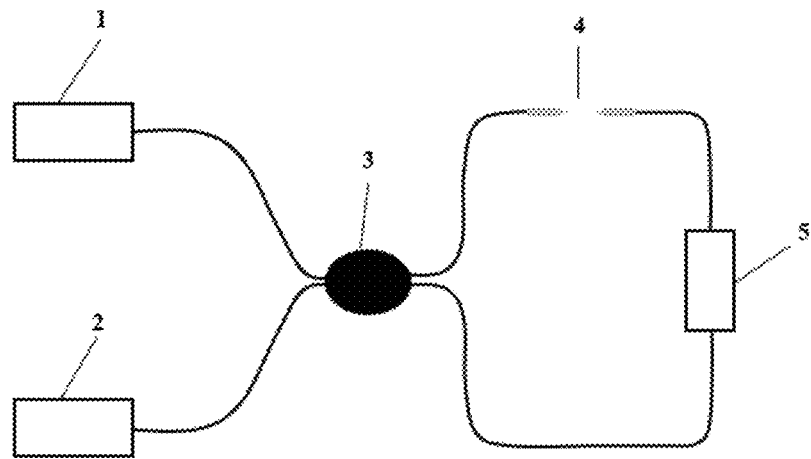

Notification of Grant issued in corresponding Chinese Application No. 202010860521.X; dated Jan. 13, 2022; 3 pgs.
First Office Action issued in corresponding Chinese Application No. 202010860521.X; dated Aug. 19, 2021; 13 pgs.
Second Office Action issued in corresponding Chinese Application No. 202010860521.X; dated Oct. 19, 2021; 8 pgs.
Search Report issued in corresponding Chinese Application No. 202010860521.X; dated Aug. 9, 2021; 5 pgs.

* cited by examiner

METHOD FOR REALIZING HIGH STABILITY OF MICRO-NANO OPTICAL FIBER SAGNAC LOOP OUTPUT BY MEANS OF FILTER MODE CONTROL

RELATED APPLICATIONS

The present application is a U.S. National Phase of International Application Number PCT/CN2021/101135, filed Jun. 21, 2021, and claims priority to Chinese Application Number 202010860521.X, filed Aug. 25, 2020.

TECHNICAL FIELD

The present invention relates to the field of photoelectric detection technologies, and in particular to a method for realizing high stability of micro-nano optical fiber sagnac loop output by means of filter mode control.

BACKGROUND

Sagnac effect was firstly proposed by a Frenchman G. Sagnac in 1913. It was firstly used to design fiber gyros which have high sensitivity, fast response, large measuring range and electromagnetic interference immunity and the like and therefore have good application prospects in the fields such as aerospace, positioning systems and military technologies.

Optical fiber Sagnac loops may also be applied to laser filters and sensors and the like. The optical fiber Sagnac loops are widely applied in the fields such as communication devices, military detections and sensors due to its high accuracy and high resolution. But, its output stability has been always limiting its development toward high accuracy and applicability. But, it can be combined with Sagnac interference structure to generate a good interference effect. In spite of many advantages, this structure always has an instability problem unsolved in the sensing process of the sensors.

When light impinges on an optical filter during a transmission process, mode-selective reflection or transmission may occur, thus achieving the effect of filtering and mode selection. In view of this, we connect the optical filter to a micro-nano optical fiber Sagnac loop structure so as to filter out an interference mode and concentrate the interference energy on a working mode. By this mode control, the output stability of the Sagnac loop is improved. It is verified by experiment that a good effect is produced.

SUMMARY

In order to solve the stability problem of output spectra of a Sagnac loop interferometer, the present invention provides a method for realizing high stability of micro-nano optical fiber sagnac loop output by means of filter mode control, which has the reasonable design, overcomes the deficiencies of the prior arts and produces good effects.

In order to achieve the above purpose, the present invention adopts the following technical solution.

Provided is a method for realizing high stability of micro-nano optical fiber sagnac loop output by means of filter mode control. A light source, a detector, a 3 dB coupler, a micro-nano optical fiber, and an optical filter are selected; the 3 dB coupler, the micro-nano optical fiber, and the optical filter form a micro-nano optical fiber Sagnac interference structure. The optical filter is used to filter out the light of a specific mode from the system. The structure is characterized as follows: the micro-nano optical fiber and the optical filter are cascaded and then connected to two ports at one side of one 3 dB coupler to form a micro-nano optical fiber Sagnac loop, and two ports at the other side of the 3 dB coupler are connected respectively to the detector and the light source. The optical filter in this structure performs control on Sagnac in-loop working modes in the micro-nano optical fiber Sagnac loop to suppress a part of the modes so as to better concentrate energy on the working mode. Without affecting the performance of the sensor, the stability of the Sagnac interferometer can be significantly improved.

Furthermore, in the method for realizing high stability of micro-nano optical fiber sagnac loop output by means of filter mode control, the optical filter includes various fiber gratings, photoelectric filters, and mode control and selection devices.

Furthermore, the coupler splits light emitted by the light source into two optical signals of a same frequency which are transmitted clockwise and counterclockwise respectively in the micro-nano optical fiber Sagnac loop. One part of the optical signals is excited by the micro-nano optical fiber to generate cladding modes which couple back to the optical fiber of the micro-nano optical fiber Sagnac loop from the micro-nano optical fiber and reach the optical filter. The optical filter performs selective control on the modes to suppress an interference mode and strengthen a working mode. The light of the working mode meets at an output end and is interfered, and one part of the optical signals is output to the detector.

Furthermore, when the light impinges on the optical filter during a transmission process, differences of optical paths that light transmitted or reflected by the optical filter reaches an aggregation point are to be completely consistent. In this way, it is avoided that the light reflected and transmitted by the optical filter participates in interference so as to affect the output performance of the device.

The present invention has the following beneficial technical effects.

In the present invention, the optical filter is combined with the Sagnac interference structure so as to control the Sagnac in-loop working mode by use of the mode selection characteristics of the filter. In this way, the interference mode is suppressed to better concentrate energy on the working mode, thereby improving the spectrum output uniformity and stability of the Sagnac loop. Further, the reflection and transmission modes of the optical filter do not participate in interference spectrum output and thus the performance of the system will not be affected. By designing and changing the parameters of the optical filter, the output characteristics of the interferometer can be dynamically controlled.

BRIEF DESCRIPTIONS OF THE DRAWINGS

FIG. 1 is a structural schematic diagram illustrating a micro-nano optical fiber Sagnac interferometer in the method of the present invention, where the interferometer includes a light source 1, a detector 2, a 3 dB coupler 3, a micro-nano optical fiber 4 and an optical filter 5.

Figure 2A:
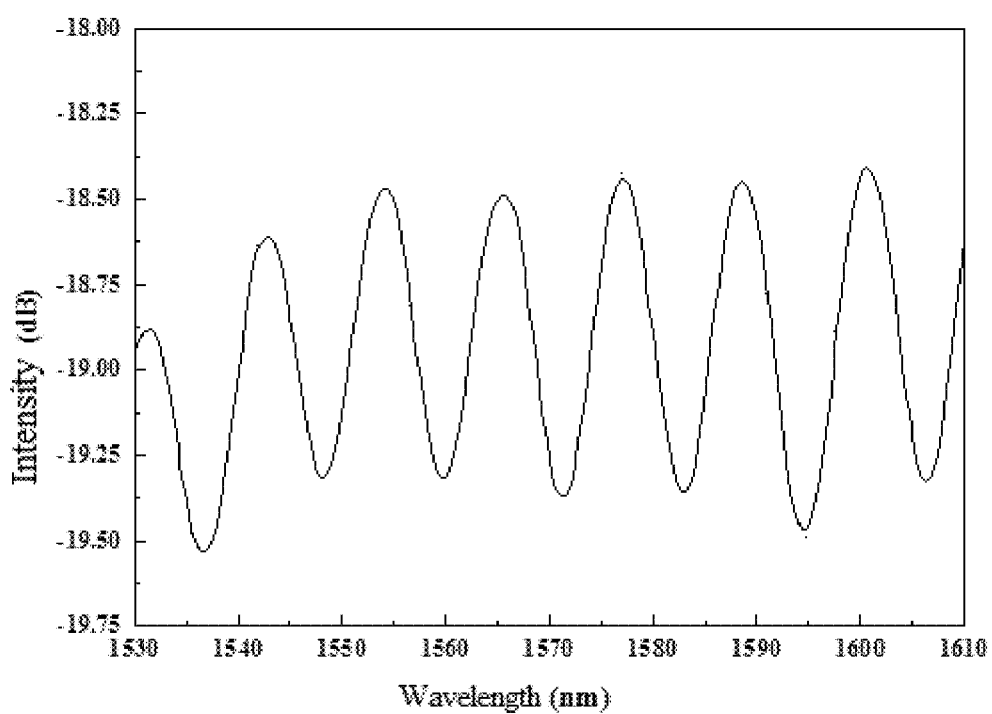
Figure 2B:
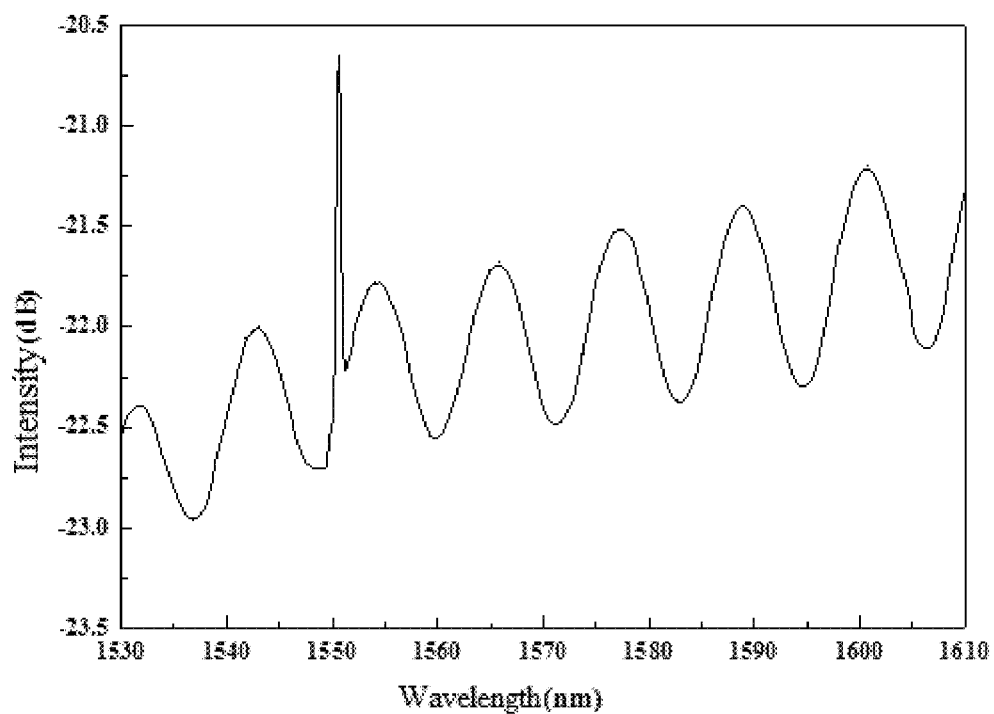

FIGS. 2(a) and 2(b) are a spectral diagram of a micro-nano optical fiber Sagnac interference structure of the present invention, where FIG. 2(a) no filter is connected; and FIG. 2(b) a filter is connected.

Figure 3A:
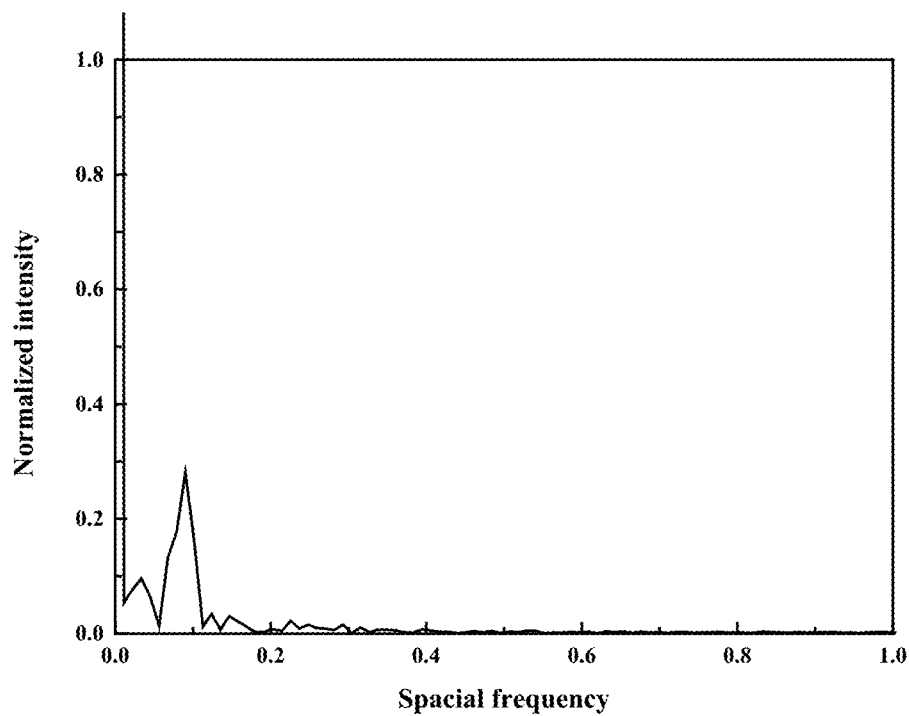
Figure 3B:
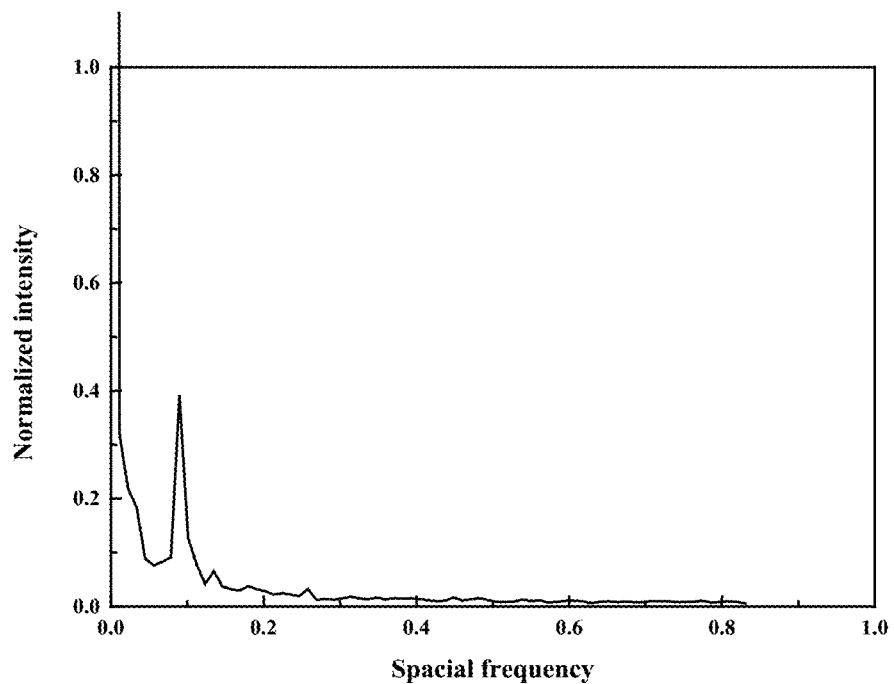

FIGS. 3(a) and 3(b) are an analytical diagram of a Fourier transform mode field when the micro-nano optical fiber Sagnac interference structure of the present invention performs refractive index sensing, where FIG. 3(a) no filter is connected; and FIG. 3(b) a filter is connected.

Figure 4A:
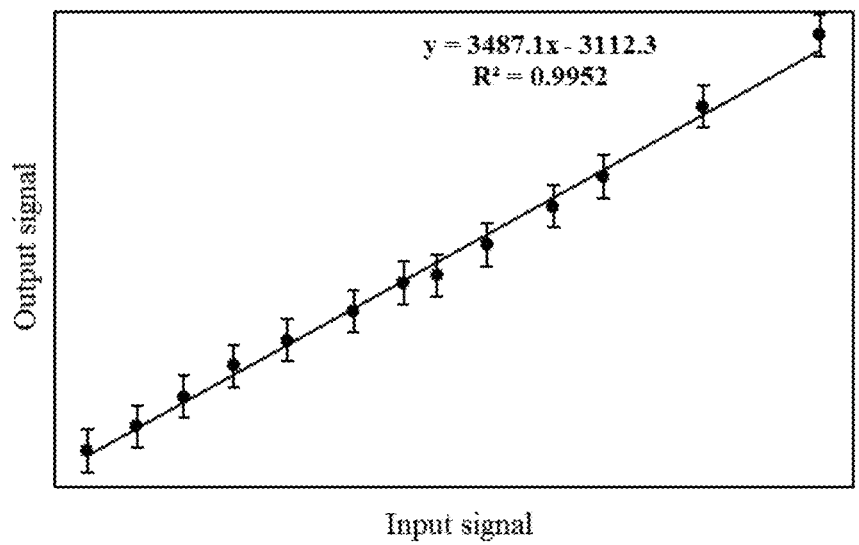
Figure 4B:
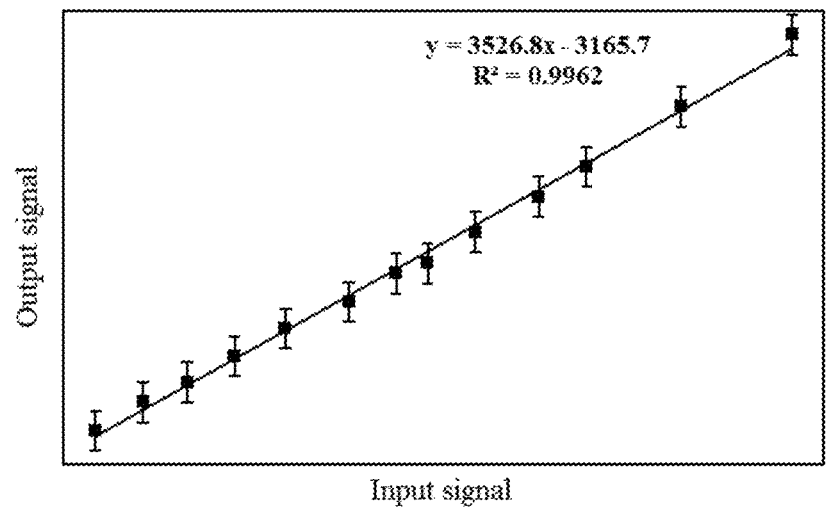

FIGS. 4(a) and 4(b) are a linear fitting diagram of refractive index sensitivity when the micro-nano optical fiber Sagnac interference structure of the present invention performs refractive index sensing, where FIG. 4(a) no filter is connected; and FIG. 4(b) a filter is connected.

Figure 5A:
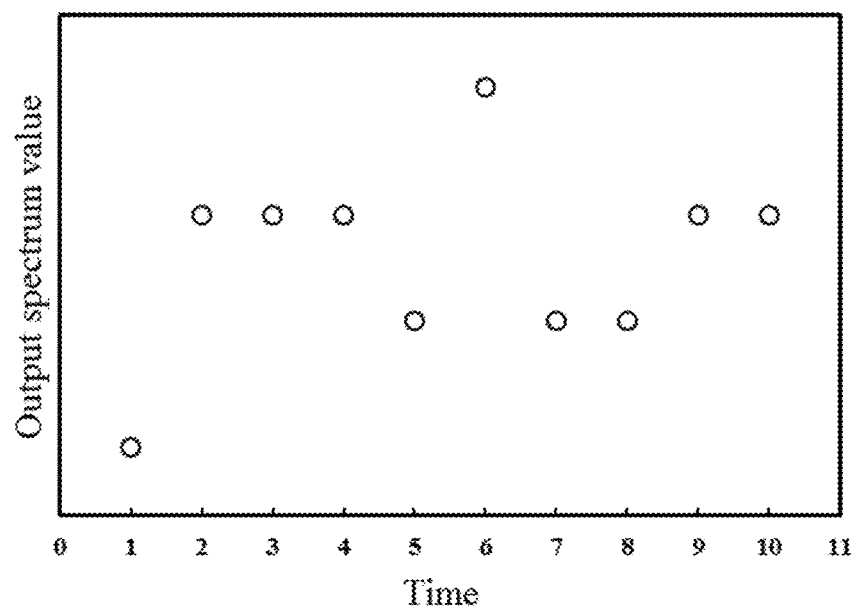
Figure 5B:
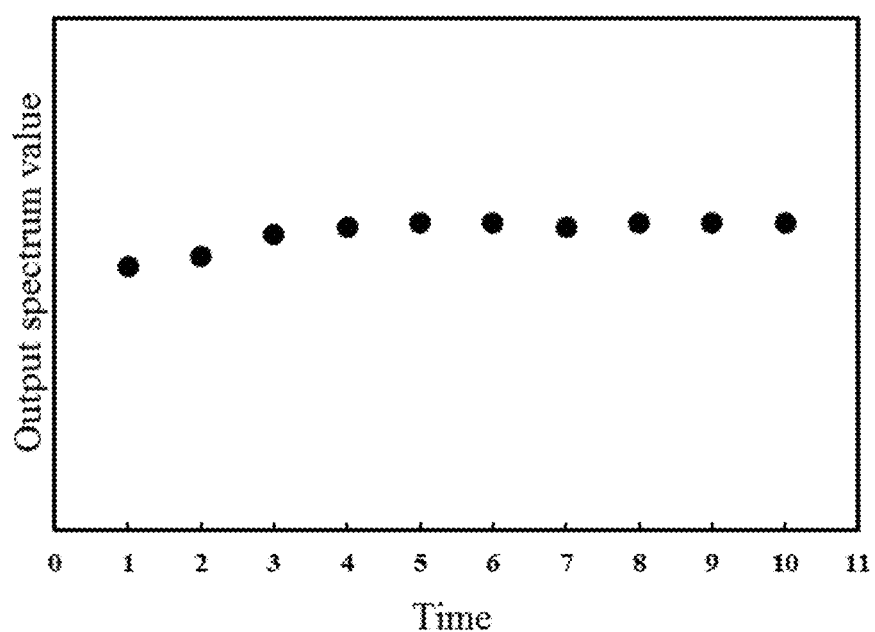

FIGS. 5(a) and 5(b) are a scatter diagram of time stability of the micro-nano optical fiber Sagnac interferometer of the present invention, where FIG. 5(a) no filter is connected; and FIG. 5(b) a filter is connected.

DETAILED DESCRIPTIONS OF EMBODIMENTS

The present invention will be further detailed in combination with the drawings and specific embodiments.

As shown in FIG. 1, there is provided a method for realizing high stability of micro-nano optical fiber sagnac loop output by means of filter mode control. The method selects a light source 1, a detector 2, a 3 dB coupler 3, a micro-nano optical fiber 4, and an optical filter 5. The 3 dB coupler 3, the micro-nano optical fiber 4, and the optical filter 5 form a micro-nano optical fiber Sagnac interference structure.

The micro-nano optical fiber 4 and the optical filter 5 are cascaded and then connected to two ports at one side of one 3 dB coupler 3 to form a micro-nano optical fiber Sagnac loop. Two ports at the other side of the 3 dB coupler 3 are connected respectively to the detector 2 and the light source 1. The optical filter 5 used herein includes various fiber gratings, photoelectric filters and mode control and selection devices and the like. Differences of optical paths of the transmitted or reflected optical signals generated by the optical filter 5 are to be equal, so as to eliminate the influence of the reflection or transmission signals of the filter on the Sagnac loop interference signals.

In order to help understand the present invention more clearly, in combination with FIGS. 2(a) and 2(b), 3(a) and 2(b), 4(a) and 2(b) and 5(a) and 2(b), further descriptions are made with examples on how to realize high stability of the micro-nano optical fiber Sagnac loop by means of filter mode control.

The 3 dB coupler 3 splits the light emitted by the light source 1 into two optical signals of a same frequency which are transmitted clockwise and counterclockwise respectively in the micro-nano optical fiber Sagnac loop. One part of the optical signals is excited by the micro-nano optical fiber to generate cladding modes which couple back to the optical fiber of the micro-nano optical fiber Sagnac loop from the micro-nano optical fiber and reach the optical filter 5. The optical filter 5 performs selective control on the modes to suppress an interference mode and strengthen a working mode. The light of the working mode meets at an output end and is interfered, and one part of the optical signals is output to the detector 2.

Furthermore, in the method for realizing high stability of micro-nano optical fiber sagnac loop output by means of filter mode control. When the light impinges on the optical filter 5 during a transmission process, differences of optical paths that light transmitted or reflected by the optical filter 5 reaches an aggregation point are to be completely consistent. In this way, it is avoided that the light reflected and transmitted by the optical filter 5 participates in interference so as to affect the output performance of the device.

It can be seen from the comparison of FIG. 2(a) and FIG. 2(b) that, when the structure is used to perform refractive index sensing, after the optical filter 5 is added, the spectral energy and the interference spectrum interval become more uniform.

It can be seen from the comparison of FIG. 3(a) and FIG. 3(b) that, before the optical filter 5 is connected, many high-order cladding modes are excited; whereas, after the optical filter 5 is connected, many low-energy high order cladding modes disappear. Therefore, a part of the excited modes are filtered out by the optical filter 5 and a small part of the working modes are strengthened in energy, thereby improving the output spectra of the interferometer.

It can be seen from the comparison of FIG. 4(a) and FIG. 4(b), before or after the optical filter 5 is connected, its sensing sensitivity is almost unchanged and even increased. Therefore, the connection of the optical filter 5 does not degrade the function of the device itself.

It can be clearly seen from the comparison of FIG. 5(a) and FIG. 5(b) that, the interference spectra of the Sagnac loop structure without the optical filter 5 fluctuate randomly over time whereas the spectra output after the optical filter 5 is added change obviously less over time. Therefore, its output stability is significantly improved.

The above is a complete implementation process of the embodiment.

Of course, the above descriptions are not intended to limit the present invention and the present invention is not limited to these examples. Any changes, modifications, additions and substititions made by those skilled in the art within the substantive scope of the present invention shall all fall within the scope of protection of the present invention.

What is claimed is:

1. A method for realizing high stability of micro-nano optical fiber sagnac loop output by means of filter mode control, selecting a light source, a detector, a 3 dB coupler, a micro-nano optical fiber, and an optical filter; wherein the 3 dB coupler, the micro-nano optical fiber, and the optical filter form a micro-nano optical fiber Sagnac interference structure;

wherein the micro-nano optical fiber and the optical filter are cascaded and then connected to two ports at one side of one 3 dB coupler to form a micro-nano optical fiber Sagnac loop, and two ports at the other side of the 3 dB coupler are connected respectively to the detector and the light source; the optical filter performs control on Sagnac in-loop working modes to suppress a part of the modes so as to better concentrate energy on the working mode ;

the coupler splits light emitted by the light source into two optical signals of a same frequency , the two optical signals are transmitted clockwise and counterclockwise respectively in the micro-nano optical fiber Sagnac loop, the clockwise the optical signals are excited by the micro-nano optical fiber to generate a cladding modes which couples back to the optical fiber of the micro-nano optical fiber Sagnac loop from the micro-nano optical fiber and reaches the optical filter, the optical filter performs selective control on the modes to suppress an interference mode and strengthen a working mode, the light of the working mode meets with the counterclockwise light at an output end of the coupler and is interfered, and interference spectra are output to the detector;

differences of optical paths of the transmitted or reflected optical signals generated by the optical filter are to be equal and differences of optical paths that the transmitted or reflected optical signals reach an aggregation point are to be completely consistent.

2. The method of claim 1, wherein the optical filter comprises various fiber gratings, photoelectric filters, and mode control and selection devices.

\* \* \* \* \*